United States Patent
Reuschel

(10) Patent No.: US 8,109,847 B2
(45) Date of Patent: Feb. 7, 2012

(54) BELT-DRIVEN CONICAL-PULLEY TRANSMISSION, METHOD FOR CONTROLLING AND OPERATING IT, AND VEHICLE HAVING SUCH A TRANSMISSION

(75) Inventor: Michael Reuschel, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1064 days.

(21) Appl. No.: 11/256,672

(22) Filed: Oct. 22, 2005

(65) Prior Publication Data

US 2006/0105867 A1   May 18, 2006

(30) Foreign Application Priority Data

Oct. 23, 2004   (DE) .......................... 10 2004 051 703

(51) Int. Cl.
*F16H 61/00* (2006.01)
*F16H 55/56* (2006.01)

(52) U.S. Cl. .............................. 474/18; 474/8

(58) Field of Classification Search ................ 474/8–28; 464/7–16
See application file for complete search history.

(56) References Cited

U.S. PATENT DOCUMENTS

| | | | | |
|---|---|---|---|---|
| 4,162,619 A | * | 7/1979 | Nixon, Jr. | 464/20 |
| 4,854,918 A | | 8/1989 | Brasse et al. | 474/11 |
| 6,135,915 A | * | 10/2000 | Aoki et al. | 477/43 |
| 6,243,638 B1 | * | 6/2001 | Abo et al. | 701/51 |
| 6,322,466 B1 | * | 11/2001 | Eidloth | 474/8 |
| 6,500,085 B2 | * | 12/2002 | Kawachi | 474/199 |
| 6,634,982 B2 | * | 10/2003 | Miki et al. | 477/45 |
| 7,237,638 B2 | * | 7/2007 | Ishikawa et al. | 180/219 |
| 2001/0031678 A1 | * | 10/2001 | Schmid et al. | 474/18 |
| 2004/0192479 A1 | * | 9/2004 | Matsuno | 474/70 |
| 2005/0014584 A1 | * | 1/2005 | Katou et al. | 474/28 |
| 2005/0079937 A1 | * | 4/2005 | Heide | 474/14 |
| 2005/0192132 A1 | * | 9/2005 | Faust et al. | 474/18 |

FOREIGN PATENT DOCUMENTS

| | | |
|---|---|---|
| DE | 38 24 864 A1 | 2/1989 |
| DE | G 82 21 745.9 U1 | 9/1990 |
| DE | 103 54 720 A1 | 6/2004 |
| WO | WO2004010029 A2 * | 1/2004 |

* cited by examiner

*Primary Examiner* — Michael Mansen
*Assistant Examiner* — Robert Reese
(74) *Attorney, Agent, or Firm* — Alfred J. Mangels

(57) ABSTRACT

An automatic transmission in the form of a belt-driven conical-pulley transmission having conical disk sets on the power input and power output sides, and an endless torque-transmitting member interconnecting the input side and the output side disk sets for transmitting torque therebetween. At least one stop at at least one of the end positions of at least one axially displaceable disk is provided with a cushioned retarding component for minimizing disk impact loads.

16 Claims, 5 Drawing Sheets

BELT-DRIVEN CONICAL-PULLEY TRANSMISSION, METHOD FOR CONTROLLING AND OPERATING IT, AND VEHICLE HAVING SUCH A TRANSMISSION

BACKGROUND OF THE INVENTION

1. Field of the Invention

The present invention concerns an automatic transmission in the form of a belt-driven conical-pulley transmission, such as is known, for example, from DE 10 2004 015 215 and other publications, as well as to a method for controlling and/or operating it and a vehicle equipped with it.

2. Description of the Related Art

Automatic transmissions in the broader sense are converters, whose momentary transmission ratio changes automatically, in steps or continuously, as a function of present or anticipated operating conditions, such as partial load, and thrust and environmental parameters, such as temperature, air pressure, and humidity. They include converters that are based on an electrical, pneumatic, hydrodynamic, or hydrostatic principles, or on a principle that is a mixture of those principles.

The automation refers to a variety of functions, such as start-up, choice of transmission ratio, or type of transmission ratio change in various operating situations, where the type of transmission ratio change can mean, for example shifting, to different gear levels in sequence, skipping gear levels, and the speed of shifting.

The desire for convenience, safety, and reasonable construction expense determines the degree of automation, i.e., how many functions run automatically.

As a rule, the driver can intervene manually in the automatic sequence, or can limit it for individual functions.

Automatic transmissions in the narrower sense, as they are used today primarily in the construction of motor vehicles, usually have the following structure:

On the input side of the transmission there is a start-up unit in the form of a regulatable clutch, for example a wet or dry friction clutch, a hydrodynamic clutch, or a hydrodynamic converter.

With a hydrodynamic converter, often a lock-up clutch is connected in parallel with the pump and turbine parts, which increases the efficiency by transmitting the force directly and damps the oscillations through defined slippage at critical rotational speeds.

The start-up unit drives a mechanical, continuously adjustable or stepped multi-speed gearbox, which can include a forward/reverse drive unit, a main gear group, a range gear group, a split gear group, and/or a variable speed drive unit. Transmission gear groups can be of intermediate gear or planetary design, with spur or helical tooth system, as a function of the requirements in terms of quietness of operation, space conditions, and transmission ratio options.

The output element of the mechanical transmission, a shaft or a gear, drives a differential, directly or indirectly, via intermediate shafts or an intermediate stage with a constant transmission ratio. The differential can be configured as a separate gearbox or as an integral component of the automatic transmission. In principle, the transmission is suitable for longitudinal or transverse installation in the vehicle.

To adjust the transmission ratio in the mechanical transmission there are provided hydrostatic, pneumatic, and/or electrical actuators. A hydraulic pump, which operates by the displacement principle, supplies oil under pressure for the start-up unit, in particular the hydrodynamic unit, for the hydrostatic actuators of the mechanical transmission, and for lubricating and cooling the system. Depending upon the necessary pressure and delivery volume, possibilities include gear pumps, screw pumps, vane pumps, and piston pumps, the latter usually of radial design. In practice, gear pumps and radial piston pumps have come to predominate for that purpose, with gear pumps offering advantages because they are less expensive to build, and radial piston pumps offering advantages because of their higher pressure level and better ability to be regulated.

The hydraulic pump can be located at any desired position in the transmission, on a main or a secondary shaft that is constantly driven by the drive unit.

Continuously adjustable automatic transmissions are known that consist of a start-up unit, a reversing planetary gearbox as the forward/reverse drive unit, a hydraulic pump, a variable speed drive unit, an intermediate shaft and a differential. The variable speed drive unit in turn is made up of two pairs of conical disks and an endless torque-transmitting means. Each pair of conical disks includes a second conical disk that is displaceable in the axial direction. Between the pairs of conical disks runs the endless torque-transmitting means, which can be, for example, a thrust element belt, a tension chain, or a strap belt. Moving the second conical disk changes the running radius of the endless torque-transmitting means, and thus the transmission ratio of the continuously adjustable automatic transmission.

Continuously adjustable automatic transmissions require a high pressure level in order to be able to adjust the conical disks of the variable speed drive unit with the desired speed at all operating points, and also to transmit the torque with sufficient basic pressure with minimum wear.

One object of the present invention is to increase the operational strength of the components and thus to prolong the operating life of such an automatic transmission. A further object of the present invention is to increase the torque transmission capability of such a transmission and to be able to transmit higher forces through the components of the transmission. Furthermore, hence another object, such a transmission should be cost-effectively producible.

Another object of the invention is to be able to move the variable speed drive unit of a belt-driven conical-pulley transmission at the highest possible speed, i.e., to achieve the maximum adjustment between underdrive and overdrive, or vice versa, as quickly as possible. In the previously known continuously variable vehicle transmissions, in particular in transmissions having an endless torque-transmitting means, the quick adjustment proceeds in most cases in such away that a quick transmission ratio adjustment is typically transmission ratio regulated. But that transmission-ratio-regulated operation must take account of the former type of regulation itself. In order to prevent oscillations, one must normally put up with sacrifices in the adjustment dynamics, i.e., a slowing of the adjustment, because for reasons of stability the maximum force cannot be utilized during the entire adjustment process.

Furthermore, the speed of adjustment must be reduced before the stops are reached, since the latter cannot be approached with high dynamics, and are also unable to assume the necessary retardation process themselves. In particular in transmissions such as, for example, a concept in which a CVT transmission is operated in combination with an automated shift transmission or a stepped automatic transmission that is connected in series with it, it is important when shifting to be able to adjust the CVT part of the transmission as quickly as possible.

The several objects are achieved by the invention presented in the claims and the description and explained in connection with the figures, along with its refinements.

SUMMARY OF THE INVENTION

In accordance with the invention a contribution is made to solving the problem and to improving known transmissions by a belt-driven conical-pulley transmission having pairs of conical disks on the power input side and the power output side. The disk pairs each have a fixed disk and a displaceable disk, which are positioned on respective shafts on the input side and on the power output side and are connectable by means of an endless torque-transmitting means. At least one stop is provided with a retarding mechanism at least at one of the end positions of at least one displaceable disk.

That approach leads to optimization of the stop or stops. It is advantageous if they are designed in such a way that shortly before the limit stop, at which the endless torque-transmitting means, for example in the form of a chain, can run out of the disk set, elasticity is built in which ensures that the disk set sustains no damage by travel to the stop.

It can be especially advantageous in a belt-driven conical-pulley transmission in accordance with the invention, if the retarding mechanism operates automatically.

It can be advantageous in a belt-driven conical-pulley transmission in accordance with the invention if the stop has a damping ring, which can be designed in more than one piece.

In general, it can be advantageous if the damping ring is made of a steel material that has some elasticity.

In addition, the damping ring can be enclosed by two bearing shells.

In a belt-driven conical-pulley transmission in accordance with the invention, it can be advantageous if a pressure medium is compressed in the area of the stop for the hydraulic medium present in the belt-driven conical-pulley transmission to be used as the pressure medium.

To that end, the hydraulic medium needed for adjusting the transmission ratio can be used as the pressure medium.

It is possible, for example, to bring the hydraulic medium through a cover to a specially formed stop, and of forming that stop in such a way that during the adjustment and shortly before the stop compression of the hydraulic medium occurs and damping is thereby achieved. To that end, the oil needed for the adjustment can be fed, for example, through a separate branch pipe to the damping stop.

It can be especially advantageous in a belt-driven conical-pulley transmission in accordance with the invention if the maximum adjustment force is generated to adjust the transmission ratio, whereby it can be useful to assist the quick adjustment of the maximum adjusting force by means of software, which can be achieved, for example, by an offset in the control variable, wherein the offset can be an electrical current offset.

The software control can occur, for example, in that at the command "quick adjustment" the control variable is manipulated by an offset value, precontrolled, in such a way that the maximum adjusting force is generated for the adjustment. It is conceivable, for example, in an underdrive quick adjustment for the current to then be immediately increased by an offset to 1000 mA, for example. Shortly before the stop is reached, the current can then be lowered to a value that is necessary to hold the underdrive transmission ratio. In most cases that is known when the particular load situation (variable speed drive unit torque, speed of rotation) is known.

It would also be possible, if one wished to remain in a quasi-regulated mode, to provide for a regulator parameter shift or a regulator structure shift for the quick adjustment, so that a maximum adjusting force can be produced in the shortest possible time. At the same time, the set point should be changed so that a large control deviation is achieved, thereby changing the control variable so that maximum adjustment forces are achieved.

It can also be advantageous with a belt-driven conical-pulley transmission in accordance with the invention if during a quick adjustment the regulated operating condition is supported by having values produced directly for the set point and that result in a large control deviation; the control variable can assume extreme values directly.

It can also be advantageous if extreme values are applied for the control variable in a very short time.

In a belt-driven conical-pulley transmission in accordance with the invention it can be advantageous if the quick adjustment is supported by the software in such a way that an increase or changeover of the regulating parameters occurs in transmission-ratio-regulated operation, so that the control values assume high values or extreme values in a short time, whereby a structural change can take place in the regulator so that the control values assume high values or extreme values in a short time.

The invention also relates to a method for controlling and/or operating a transmission in accordance with the invention.

In addition, the invention relates to a vehicle having a transmission in accordance with the invention.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
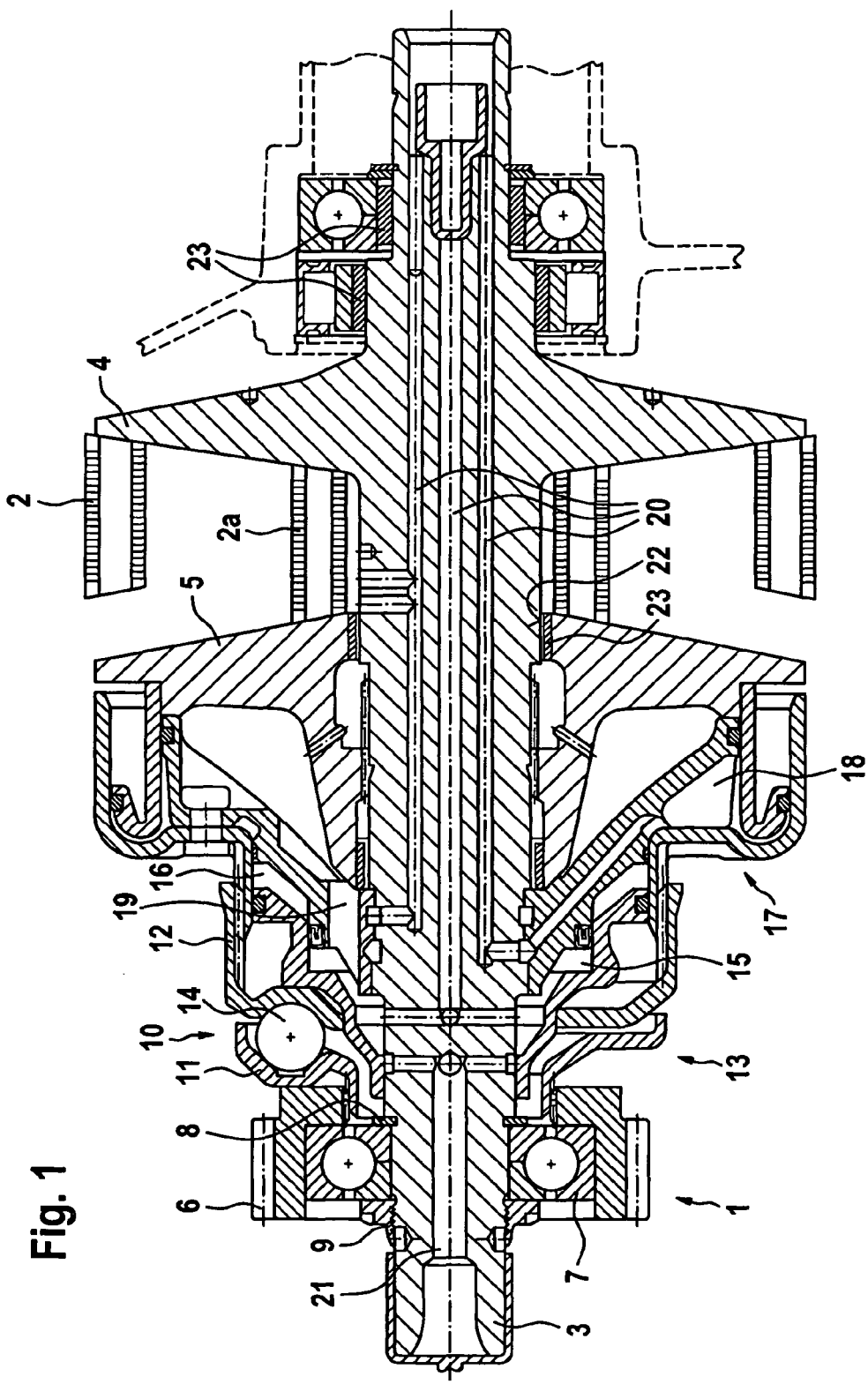
FIG. 1 is cross-sectional view of a part of a belt-driven conical-pulley transmission.

Referring now to the drawings, FIG. 1 shows only part of a belt-driven conical-pulley transmission, namely the input or driven side of the belt-driven conical-pulley transmission 1, which is driven by a drive engine, for example an internal combustion engine. In a fully implemented belt-driven conical-pulley transmission, assigned to that input-side part is a complementarily-designed output side part, the two parts being connected by an endless torque-transmitting means in the form of a plate-link chain 2, for example, for transmitting torque. Belt-driven conical-pulley transmission 1 has a shaft 3 on its input side, which is designed in the illustrated exemplary embodiment as integrally formed with a stationary conical disk or fixed disk 4. That axially fixed conical disk 4 is positioned in the axial longitudinal direction of shaft 3 close to and opposite an axially displaceable conical disk or displaceable disk 5.

In the illustration in accordance with FIG. 1, plate-link chain 2 is shown in a radial outer position on disk pair 4, 5 on the input side, resulting from the fact that the axially displaceable conical disk 5 is repositioned toward the right in the drawing, and that repositioning movement of axially displaceable conical disk 5 results in a movement of plate-link chain 2 in the radially outward direction, producing a change in the transmission ratio of the transmission toward greater speed.

Axially displaceable conical disk 5 can also be repositioned to the left in the plane of the drawing in a known manner, where in that position plate-link chain 2 is in a radially inner position (which is indicated by reference numeral 2a), producing a transmission ratio of belt-driven conical-pulley transmission 1 in the direction of a slower speed.

The torque provided by a drive engine (not shown) is introduced into the input side part of the belt-driven conical-pulley transmission shown in FIG. 1 by way of a gear 6 mounted on shaft 3. Gear 6 is supported on shaft 3 by means of a roller bearing in the form of a ball bearing 7 that absorbs axial and radial forces, and is fixed on shaft 3 by means of a washer 8 and a shaft nut 9. Between gear 6 and axially displaceable conical disk 5 is a torque sensor 10, with which a spreader disk configuration 13 having an axially fixed spreader disk 11 and an axially displaceable spreader disk 12 is associated. Located between the two spreader disks 11' 12 are roller elements, for example in the form of the illustrated balls 14.

A torque introduced via gear 6 results in the formation of an angle of rotation between axially stationary spreader disk 11 and axially displaceable spreader disk 12, which results in an axial repositioning of spreader disk 12 because of start-up ramps located on the latter, onto which the balls 14 run up, thus causing an axial offset of the spreader disks with respect to each other.

Torque sensor 10 has two pressure chambers 15, 16, of which first pressure chamber 15 is provided with a pressure medium as a function of the torque introduced, and second pressure chamber 16 is supplied with pressure medium as a function of the transmission ratio of the transmission.

To produce the clamping force that is applied as a normal force to the sides of plate-link chain 2 between axially stationary disk 4 and axially displaceable disk 5, a piston and cylinder unit 17 is provided which has two pressure chambers 18, 19. First pressure chamber 18 changes the pressure on plate-link chain 2 as a function of the transmission ratio, and second pressure chamber 19 serves in combination with torque-dependent pressure chamber 15 of torque sensor 10 to increase or reduce the clamping force that is applied to plate-link chain 2 between disks 4, 5.

To supply pressure medium to the pressure chambers, shaft 3 has three conduits 20, through which pressure medium is fed from a pump (not shown). The pressure medium can drain from shaft 3 through a conduit 21 on the outlet side, and can be conducted back to the circuit.

The pressurization pressure chambers 15, 16, 18, 19 results in a torque-dependent and transmission-ratio-dependent repositioning of axially displaceable disk 5 on shaft 3. To receive displaceable disk 5, shaft 3 has centering surfaces 22, which serve as a sliding seat for displaceable disk 5.

As can be readily seen from FIG. 1, in the area of each of the bearing positions of disk 5 on shaft 3, belt-driven conical-pulley transmission 1 has a noise damping device 23. For that purpose the noise damping device can have a ring body and a damping insert, or can consist only of a damping insert.

The reference numerals used in FIG. 1 also apply to the essentially comparable features in the other drawing figures. Thus the drawing figures are to be regarded as a unit in that respect. For the sake of clarity, only the reference numerals that go beyond those in FIG. 1 are used in the other figures.

Figure 2:
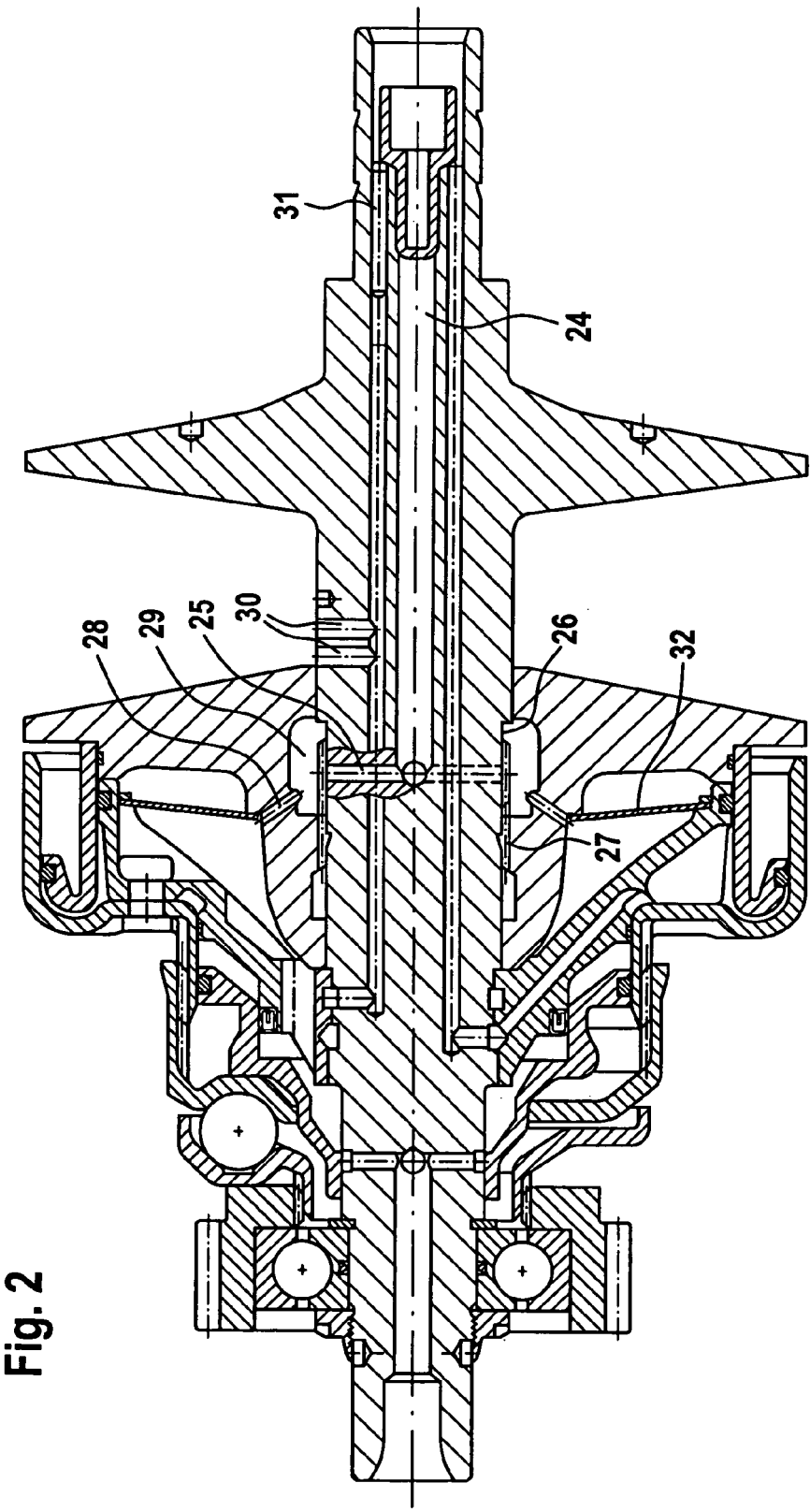
FIG. 2 is a cross-sectional view of a part of another embodiment, corresponding substantially to FIG. 1.

In FIG. 2, only the middle one of the three conduits 20 is fully configured in a form that is modified from that shown in FIG. 1. It is evident that bore 24 that forms the central conduit 20 is produced as a blind bore from the side shown on the right in FIGS. 1 and 2, and is significantly shorter in FIG. 2 than in FIG. 1. Such blind bores are complex and expensive to produce and require a very high degree of precision in manufacturing. The expense of production and the requirements in terms of process reliability increase disproportionately with the length. Thus, shortening a bore of that sort has a favorable effect on the production costs, for example.

In the area of the end of bore 24 the lateral bore 25 branches off, of which there can be a plurality arranged circumferentially. In the case shown, lateral bore 25 is shown as a radial bore; however, it can also be produced at a different angle as an inclined bore. Bore 25 penetrates the shell of shaft 3 at a place that is independent of the operating mode, i.e., independent of the transmission ratio setting, for example, in a region that is always covered by displaceable disk 5.

By shifting lateral bore 25 to the region covered by displaceable disk 5, shaft 3 can be made axially shorter, enabling construction space to be saved. In addition, shortening shaft 3 can also result in reduced loading.

The outlet of the conduit or lateral bore 25 can be located in the region of the recess 26, for example, which is adjacent to the centering surface 22 of the shaft. That can be particularly advantageous if the tooth system 27, which connects displaceable disk 5 to shaft 3 so that it can be axially displaced but is rotationally fixed, is subjected to heavy demands, for example by the transmission of torque.

But in many cases the load on the tooth system 27 will not be the most critical design criterion, so that the outlet of bore 25 can be placed in the area of that tooth system, as shown in FIG. 2. Placing lateral bore 25 at the tooth system 27 region instead of in the recess 26 produces an advantage through the fact that a greater resistance moment is present, which reduces the bending stress in the surface layer. In addition, the surface moment of inertia is greater at that location, while the critical layer, which is disturbed by lateral bore 25, remains at an approximately constant radius. That results in a significant reduction of the stresses in the critical area around the outlet of lateral bore 25 between the teeth of tooth system 27.

The system for supplying hydraulic fluid is identical in FIGS. 1 and 2, since pressure chambers 15 and 19 are connected to each other and displaceable disk 5 has connecting bores 28, which connect the region of the tooth system 27 with pressure chamber 19.

In the figures, displaceable disk 5 is in its most extreme left position, which corresponds to the start-up transmission ratio or underdrive. If displaceable disk 5 is now repositioned to the right in the direction of fixed disk 4, there is always part of the hollow or of chamber 29 over the outlet of the lateral bore or of conduit 25, so that the necessary fluid supply is always ensured, just as in FIG. 1. Also as in FIG. 1, there are two shift states for pressure chamber 16, which depend upon the axial position of displaceable disk 5. In the illustrated position the control bores 30 are free, so that the conduit 20 that is connected to them and is closed axially with a stopper 31, and the pressure chamber 16, which is connected to the latter through a conduit (not shown), are not pressurized or have only ambient pressure. If displaceable disk 5 is now moved toward fixed disk 4, it passes over control bores 30, so that starting at a certain distance chamber 29 comes to rest over the openings of control bores 30. In chamber 29, however, a high pressure as a function of the torque prevails, which is then also conveyed through control bores 30 and conduit 20 into pressure chamber 16, so that high pressure is also present there. In that way two shift states are realized, which control the clamping force as a function of the transmission ratio.

In addition, in FIG. 2 there is a disk spring 32 that moves displaceable disk 5 to a predetermined axial position when transmission 1 is not under pressure, enabling a transmission ratio of transmission 1 to be set that prevents excessive loads, for example when the vehicle is being towed.

Figure 3:
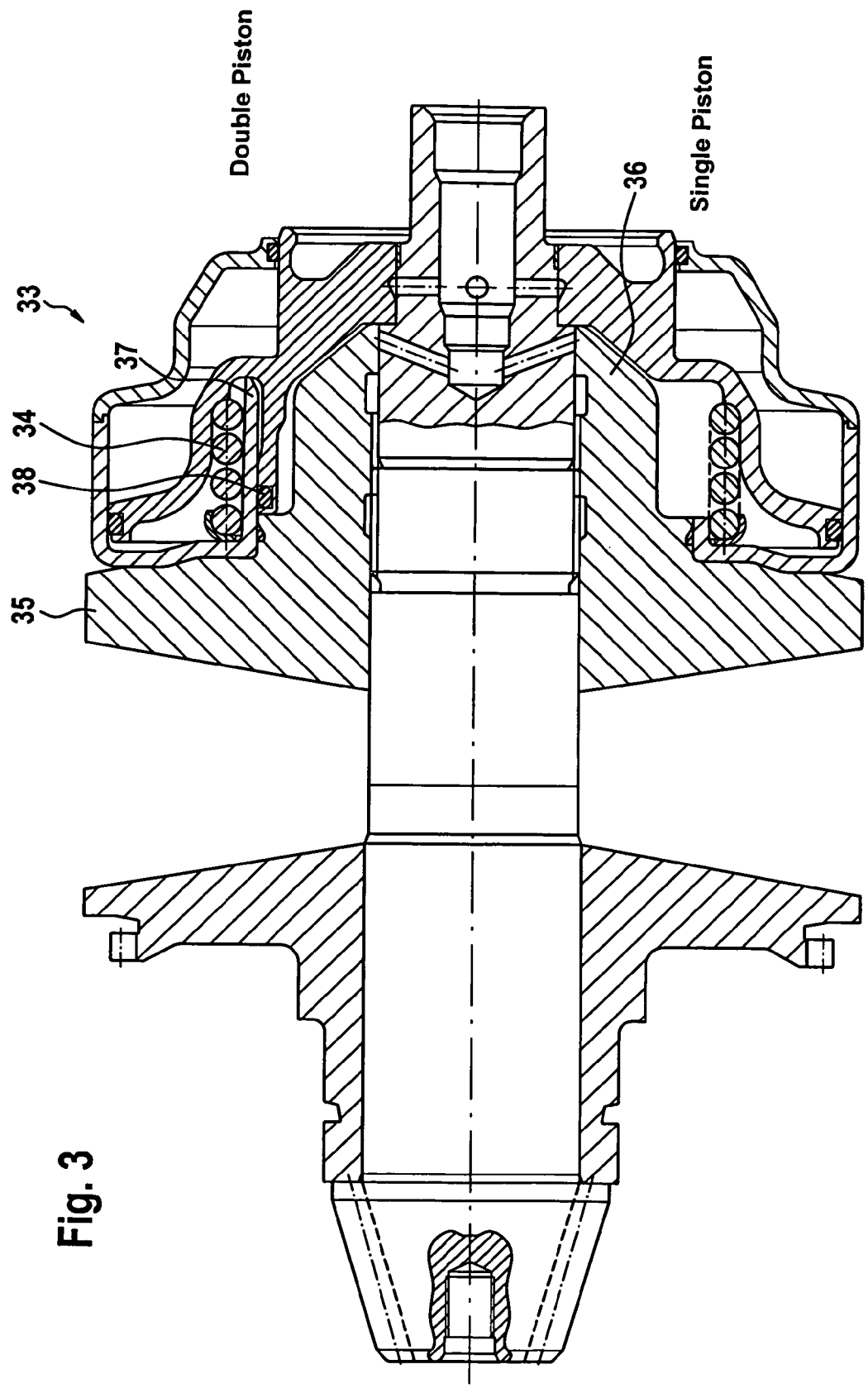
FIG. 3 shows exemplary embodiments of output side pairs of conical disks.

FIG. 3 shows two possible configurations of conical disk set 33 on the output side, with the lower half of the figure showing a disk set constructed in accordance with the single piston principle, while the upper half shows a disk set constructed in accordance with the dual piston principle, as described, for example, in DE 103 54 720.7.

In the dual piston version, separate pistons are available for the clamping and the repositioning, whereas in the single piston version only one piston/cylinder unit introduces the corresponding force into the disk set.

Compared to the customary versions heretofore, spring 34 here has a larger diameter, so that its point of application on displaceable disk 35 is radially farther outward. One of the advantages resulting from that arrangement is that more construction space is available to thicken the conical disk neck or hub 36, or to design it stronger geometrically and increase its diameter. The resulting gain in strength was already described earlier. In the dual piston version shown in the upper half of FIG. 3, it results in a modified arrangement of spring 34 to the effect that it is repositioned from the radially inner pressure chamber into the radially outer pressure chamber.

Sheet metal part 37 that radially inwardly supports spring 34 is firmly connected to displaceable disk 35, and its side facing away from spring 34 serves as a sealing path for seal 38. However, that sealing path can also be integrally formed with displaceable disk 35. That part formed integrally with displaceable disk 35 would then radially inwardly hold spring 34 radially to the inside with its radially outer area. With spring 34 at the inside, that part can form one sealing path radially at the inside and one radially at the outside.

Figure 4:
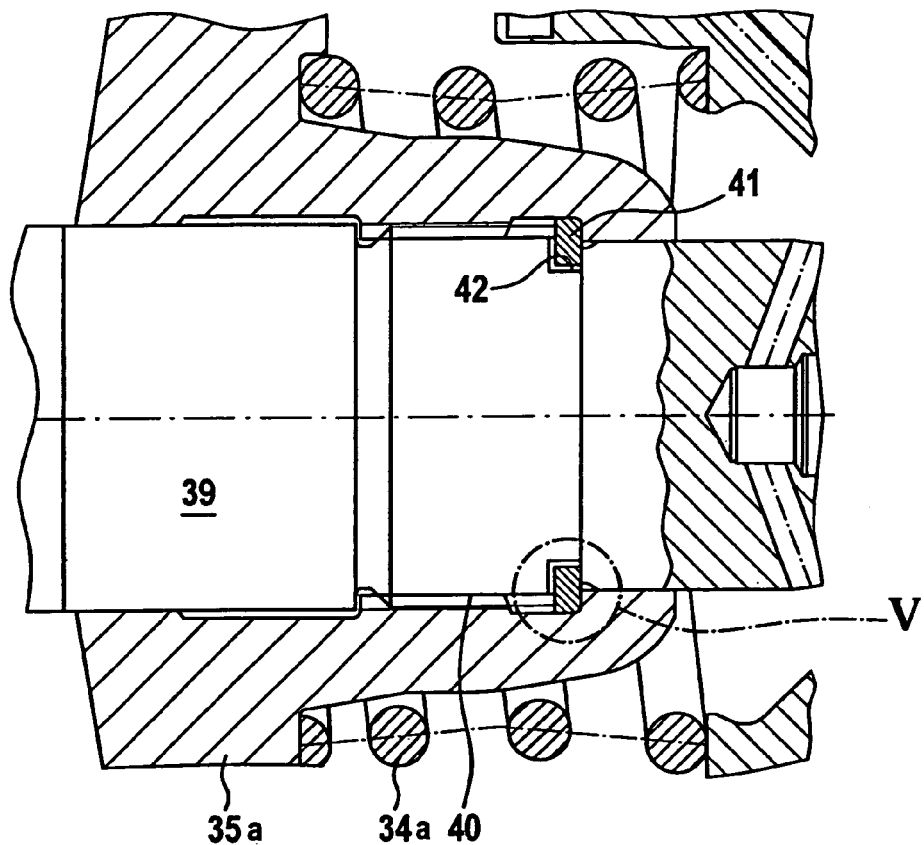
FIG. 4 is an enlarged view of a portion of the hub area of the output side displaceable disk.

FIG. 4 shows a detail of the set of conical disks 33 on the output side, with the displaceable disk 35a on the output side being held on the output side shaft 39 so that it is rotationally fixed but axially displaceable by means of the tooth system 40. The tooth system 40 is in the form of a multiple-tooth spline, i.e., the tooth profile is repeated a plurality of times around the circumference. Also shown is spring 34a, which, as already described, applies pressure to the output side displaceable disk 35a in the direction of the output side fixed disk, which is not shown in FIG. 4 and is positioned to the left of output side displaceable disk 35a, as is shown schematically in FIG. 3.

In the illustrated extreme left position relative to output shaft 39 of output side displaceable disk 35a, endless torque-transmitting means 2 runs at the greatest possible diameter due to the closest possible wedge-shaped gap between the two conical disks. Since the set of conical disks 33 on the output side is shown here, the variable speed drive unit of the transmission is in the underdrive position, which serves, for example, for starting up.

In the end position shown in FIG. 4, the displaceable disk 35a on the output side is against stop ring 41. Stop ring 41 is positioned and held in a groove 42 of output side shaft 39.

Because of its elasticity, stop ring 41 prevents an excessively hard end impact of output side displaceable disk 35a in the area of the maximum underdrive adjustment position. Stop ring 41 can be made for example of steel wire mesh of braided steel wire, which makes it possible to ensure that it attains the desired working life while having sufficient elasticity. It would also be conceivable to form stop ring 41 using a spring assembly, for example in the form of a Belleville spring assembly. That makes it possible to produce a desired impact behavior, such as, for example, a progressively increasing counterforce, so that output side displaceable disk 35a is cushioned relatively gently in the region before its end impact. The function is comparable to that of a stop bumper.

Figure 5:
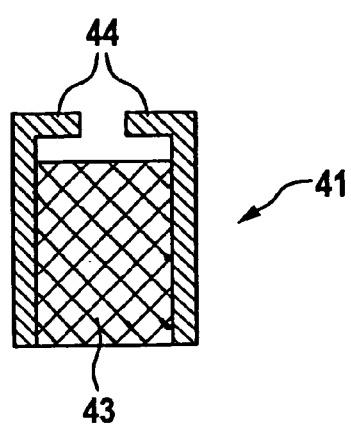
FIG. 5 is a partial section of an embodiment of a damping ring.

FIG. 5 shows an enlarged detail of the area designated V in FIG. 4, and illustrates an enlargement of the cross section of stop ring 41. FIG. 5 shows, merely as an example, that stop ring 41 can be made of steel wire mesh or braided steel wire 43, on each axial side of which a bearing shell 44 is positioned. In the example shown, when the steel wire mesh or braided steel wire is compressed the bearing shells 44 form a practically solid stop, because their regions that extend axially toward each other come to rest against each other.

Figure 6:
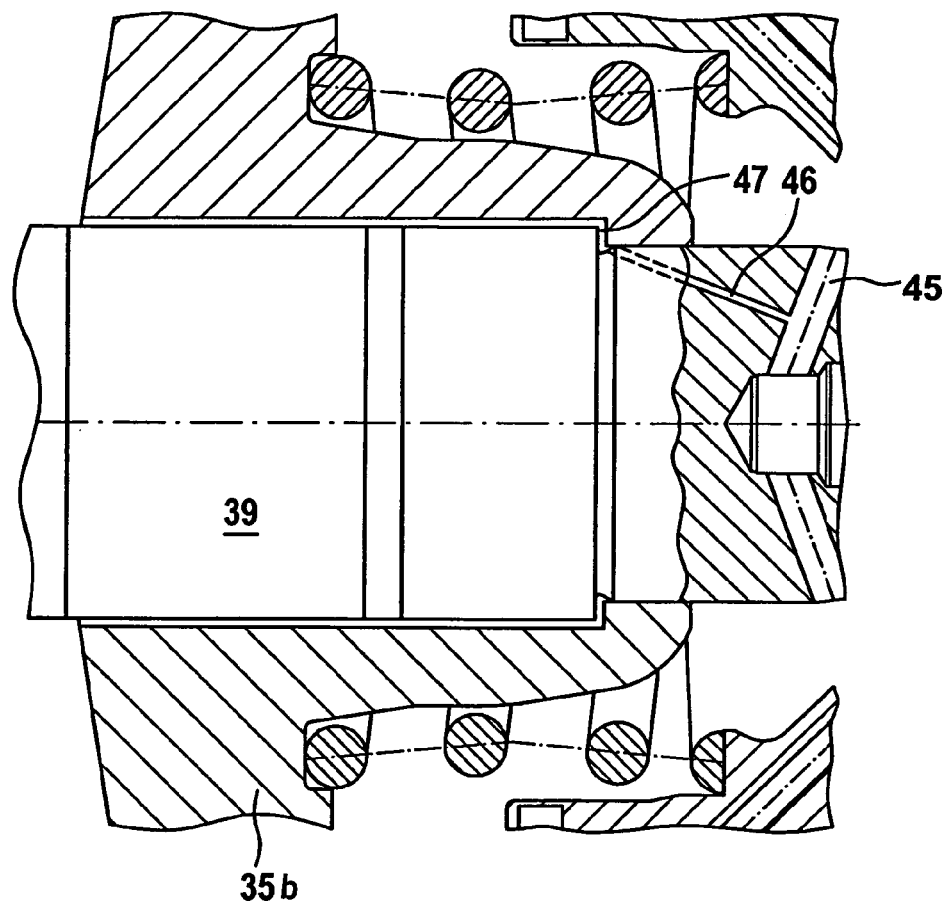
FIG. 6 is another enlarged view of a portion of the hub area of an output side displaceable disk.

FIG. 6 shows, as an example, an end stop in which the damping is accomplished by hydraulic oil. Again, it is the output side shaft 39 and the output side displaceable disk 35b that are shown, and again in the region of the maximum underdrive position as in FIG. 4. An oil feed conduit 46 branches off from the oil feed conduit 45 shown in FIG. 6, which conveys oil to the adjusting unit of the output side displaceable disk 35b. Oil feed conduit 45 can supply hydraulic medium both to the piston-cylinder unit that is used to adjust the transmission ratio and to the one that is used for clamping. Through the conduit 46 that branches off from oil feed conduit 45 and that can be circumferentially arranged as multiple conduits, hydraulic medium is brought into chamber 47 in the region of the end stop. Chamber 47 is located axially between a shoulder of output side shaft 39 and a corresponding opposing stop of output side displaceable disk 35b. The hydraulic medium present there is then pressed out or displaced from chamber 47, which becomes smaller as output side displaceable disk 35b approaches its stop, causing the speed of displaceable disk 35b to be reduced, so that displaceable disk 35b comes to a damped stop. The advantage of that solution is that practically no additional components are necessary, and that the hydraulic medium that is already present in the transmission can be used to damp the end impact.

An end stop implemented in accordance with the invention is explained on the output side displaceable disk in the maximum underdrive position merely as an example. But that is by no means to be regarded as a limitation, because all of the stops present in the region of the variable speed drive unit can be implemented in accordance with the invention, or a corresponding stop can be carried out, depending, for example, upon the direction of necessary quick adjustment.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A belt-driven conical-pulley transmission comprising: a conical disk pair on a power input side and on a power output side, each disk pair including an axially fixed disk and an axially displaceable disk, wherein the disk pairs are positioned on respective input side and output side shafts and each axially displaceable disk includes an annular hub that surrounds the associated shaft; an endless torque transmitting member extending between and interconnecting the input side and output side disk pairs for transmitting torque therebetween; and at least one stop adjacent to an axial end of the annular hub of at least one axially displaceable disk and spaced axially inwardly of the axial end, the stop including an elastically deformable damping ring positioned between a radially-inwardly-extending surface of the annular hub of the at least one axially displaceable disk and an axially spaced radially-extending surface of an associated shaft that carries the at least one axially displaceable disk, wherein the radially-inwardly-extending surface of the annular hub of the at least one axially displaceable disk extends inwardly toward the longitudinal axis of the associated shaft and is positioned axially inwardly of the axial end of the annular hub of the at least one axially displaceable disk, wherein the axially spaced radially-extending surface of the associated shaft extends radially inwardly from an outer surface of the shaft toward the longitudinal axis of the associated shaft to form a radial wall of an annular groove in the shaft, wherein the elastically deformable damping ring is received in the annular groove and between the radially-inwardly-extending surface of the shaft and the radially-inwardly-extending surface of the annular hub of the at least one axially displaceable disk to provide an axially-deformable cushioned retarding component for automatically retarding axial movement of the at least one axially displaceable disk and for minimizing axially-acting disk impact loads imposed by the at least one axially displaceable disk against the at least one stop, wherein the damping ring is a multiple-element component.

2. A belt-driven conical-pulley transmission in accordance with claim 1, wherein the damping ring is formed from steel and includes an elastic element.

3. A belt-driven conical-pulley transmission in accordance with claim 2, wherein the damping ring includes two adjacent bearing shells and the elastic element is a layer of elastically deflectable metallic mesh positioned between the bearing shells to absorb impact loads.

4. A belt-driven conical-pulley transmission in accordance with claim 1, wherein the transmission ratio is adjusted by application of a maximum adjusting force.

5. A belt-driven conical-pulley transmission in accordance with claim 4, wherein the maximum adjusting force for adjusting the transmission ratio is control-software-assisted by a regulator for a quick force adjustment of the at least one axially displaceable disk.

6. A belt-driven conical-pulley transmission in accordance with claim 5, wherein the maximum adjusting force is achieved by an offset in a control variable.

7. A belt-driven conical-pulley transmission in accordance with claim 6, wherein the offset is an electrical current offset.

8. A belt-driven conical-pulley transmission in accordance with claim 5, wherein in a quick force adjustment a regulated operating mode is assisted by having set point values produced directly to provide a desired control deviation for increasing adjustment force.

9. A belt-driven conical pulley transmission in accordance with claim 8, wherein a control variable is selected to achieve in a predetermined time desired adjustment force values.

10. A belt-driven conical-pulley transmission in accordance with claim 9, wherein adjustment force values are provided in a time interval to achieve the desired adjustment force.

11. A belt-driven conical-pulley transmission in accordance with claim 8, wherein the quick force adjustment is assisted by the control software in such a way that an increase or changeover of regulating parameters occurs in transmission-ratio-regulated operation, so that control variable values increase to provide the desired force adjustment.

12. A belt-driven conical-pulley transmission in accordance with claim 11, wherein a changeover takes place in the regulator, so that the control values increase to achieve the desired force adjustment.

13. A motor vehicle including a transmission in accordance with claim 1.

14. A belt-driven conical-pulley transmission comprising: a conical disk pair on a power input side and on a power output side, each disk pair including an axially fixed disk and an axially displaceable disk, wherein the disk pairs are positioned on respective input side and output side shafts and each axially displaceable disk includes an annular hub that surrounds the associated shaft and that terminates at an outer axial end spaced axially from an inner axial end of the axially displaceable disk; an endless torque transmitting member extending between and interconnecting the input side and output side disk pairs for transmitting torque therebetween; and at least one annular stop chamber adjacent to and spaced axially inwardly of the outer axial end of the annular hub of the at least one axially displaceable disk, the annular stop chamber defining a cushioned disk-movement-retarding component for minimizing disk impact loads at an end travel position of the at least one axially displaceable disk, wherein the disk movement retarding component is a pressure-medium-receiving annular stop chamber formed between a radially-inwardly-extending surface inward of the outer axial end of the annular hub of the at least one axially displaceable disk and an axially-opposed radially-outwardly-extending surface of an associated shaft that carries the at least one axially displaceable disk, wherein the annular stop chamber is spaced axially inwardly of the outer axial end of the annular hub of the at least one axially displaceable disk and wherein the radially-inwardly-extending surface of the annular hub of the at least one axially displaceable disk extends inwardly toward the longitudinal axis of the associated shaft and terminates at a first outer cylindrical surface of the associated shaft, wherein the axially-opposed radially-outwardly-extending surface of the associated shaft extends radially outwardly of the first outer cylindrical surface of the associated shaft to a second outer cylindrical surface of the associated shaft and toward an inner annular surface of the annular hub of the at least one axially displaceable disk, the second outer cylindrical surface of the associated shaft having a diameter that is greater than the diameter of the first outer cylindrical surface of the associated shaft, wherein the at least one axially displaceable disk includes at least one hydraulic-fluid-containing adjustment chamber for adjusting a transmission ratio and for applying a clamping force to the endless torque-transmitting member, wherein the annular stop chamber is spaced from the at least one hydraulic-fluid-containing adjustment chamber and is in fluid communication with the at least one hydraulic-fluid-containing adjustment chamber through a first oil feed conduit that extends within the associated shaft from a second oil feed conduit that extends to the adjustment chamber and is within the associated shaft, wherein the first oil feed conduit extends between and interconnects the annular stop chamber with the second oil feed conduit; wherein the annular stop chamber includes an annular volume that is axially bounded by the radially-inwardly-extending surface of the annular hub of the at least one axially displaceable disk, the axially opposed, radially-outwardly-extending surface of the associated shaft that carries the at least one axially displaceable disk, an inwardly-facing annular surface of the annular hub of the at least one axially displaceable disk, and the first outer cylindrical surface of the associated shaft for hydraulically cushioning and retarding axial movement of the at least one axially displaceable disk to minimize axially-acting disk impact loads imposed by the at least one axially displaceable disk against the at least one stop.

15. A belt-driven conical-pulley transmission in accordance with claim 14, wherein a hydraulic medium that is present in the belt-driven conical-pulley transmission is utilized as the pressure medium.

16. A belt-driven conical-pulley transmission in accordance with claim 14, wherein a hydraulic medium for adjusting the transmission ratio is utilized as the pressure medium.

* * * * *